United States Patent [19]

Miller

[11] Patent Number: 4,726,811

[45] Date of Patent: Feb. 23, 1988

[54] HYDROCARBON OILS WITH IMPROVED POUR POINTS

[75] Inventor: Richard F. Miller, Humble, Tex.

[73] Assignee: Pony Industries, Inc., New York, N.Y.

[21] Appl. No.: 832,396

[22] Filed: Feb. 24, 1986

[51] Int. Cl.$^4$ ............................................. C10L 1/26
[52] U.S. Cl. ........................................ 44/62; 44/70
[58] Field of Search ................................ 44/62, 70

[56] References Cited

U.S. PATENT DOCUMENTS

| | | | |
|---|---|---|---|
| 3,048,479 | 8/1962 | Ilnyckyj et al. | 44/62 |
| 3,966,428 | 6/1976 | Rossi | 44/70 |
| 3,981,850 | 9/1976 | Wisotsky et al. | 44/62 |
| 4,108,612 | 8/1978 | Rossi et al. | 44/62 |
| 4,155,719 | 5/1979 | Sweeney | 44/70 |
| 4,160,459 | 7/1979 | Sweeney | 44/70 |
| 4,175,926 | 11/1979 | Wisotsky | 44/62 |
| 4,211,534 | 7/1980 | Feldman | 44/62 |
| 4,261,703 | 4/1981 | Tack et al. | 44/62 |

*Primary Examiner*—William R. Dixon, Jr.
*Assistant Examiner*—Ellen M. McAvoy
*Attorney, Agent, or Firm*—J. R. Magnone; A. J. Good

[57] ABSTRACT

Hydrocarbon oils containing, as a pour point depressant, a terpolymer of a vinyl ester having a total of 4 to 8 carbon atoms, vinyl alcohol and ethylene, the copolymer having a weight average molecular weight of about 1,000 to 100,000.

22 Claims, No Drawings

HYDROCARBON OILS WITH IMPROVED POUR POINTS

BACKGROUND OF THE INVENTION

This invention relates to hydrocarbonaceous oils and more particularly to hydrocarbonaceous oils having improved pour points.

In the storage, transportation and use of hydrocarbonaceous fuel oils, e.g. crude oils, gas oils, distillate fuel oils, such as heating oils, diesel oils, turbo-jet fuels and residual fuel oils and the like, problems associated with the pour point of the oils have been long recognized. The pour point of an oil is defined as the lowest temperature at which the oil will flow without disturbance when chilled under specified conditions. Pour point problems arise through the formation of solid or semi-solid waxy particles in the oils when the oils are subjected to low temperatures in storage. A related problem also exists in respect of hydrocarbonaceous residual fuel oils and waxy crude oils, in which the waxy components adversely affect the flowability and/or pumpability of the oil under low temperature conditions.

The formation of solid or semi-solid waxy particles in fuel oils and in waxy crude oils at temperatures just below their pour point causes serious distribution and/or operating difficulties. For example, the distribution of fuel oil by pumping is rendered difficult or impossible at temperatures below the pour point of the oil. Likewise, the flow of the oil at such temperatures through filters in heating systems cannot be maintained, resulting in the failure of the equipment to function. The formation of solid or semi-solid waxy particles in wax-containing crude oils gives rise to difficulties in the movement of such crude oils through pipelines at low ambient temperatures.

With respect to fuel oils, the aforementioned problems have been in part remedied by lowering the end points of oils used for blending heating and diesel oils. It has also been suggested that the fuel oils, particularly distillate fuel oils, may be dewaxed, as for example, by urea dewaxing. However, dewaxing operations are costly and readjustment of end points causes a loss of valuable product as blending material for fuel oil stocks.

Another approach in overcoming the problem has been to attempt to find a pour point depressant which will lower the pour point of the fuel oil or crude oil. This is sometimes done to lower the pour point of lubricating oils. However, materials which are effective in lowering the pour point of lubricating oils are not always effective as pour point depressants for fuel oils or crude oils.

PRIOR ART

Pour point depressants appear to function by modifying the wax crystals so that they form smaller crystals, which have a reduced tendency to form gels than larger crystals. Different types of materials have been used as pour point depressants with varying degrees of success. High molecular weight polymers are among the more successfully used pour point depressants. U.S. Pat. No. 3,726,653 discloses two component residual fuel pour point depressants one component of which may be a copolymer of an alkyl ester of an unsaturated monocarboxylic acid and a mono-olefin. U.S. Pat. No. 3,447,915 discloses fuel oil pour point depressants comprised of a terpolymer of ethylene, propylene and a $C_1$–$C_{12}$ alkyl ester of acrylic or methacrylic acid. U.S. Pat. No. 4,042,648 and other patents referred to in the second paragraph of column 1 thereof disclose thermoplastic olefin-acrylic ester copolymers and their preparation. U.S. Pat. No. 3,968,148 discloses the preparation of oligomers of higher molecular weight olefins and higher molecular weight alkyl acrylates which oligomers are useful as dispersant detergents for lube stocks. British patent No. 1,154,966 discloses the use of various homopolymers and copolymers as pour point depressants for petroleum fuels. Other U.S. patents which disclose copolymers of acrylates as pour point depressants are U.S. Pat. Nos. 2,604,453, 2,403,267, 3,304,260, 3,904,385 and 3,445,205. U.S. Pat. No. 3,567,639 discloses copolymers of ethylene and a vinyl ester as pour point depressants for crude oil and fuel oils. U.S. Pat. No. 4,419,106 discloses the use of alpha-monoolefins as pour point depressants for hydrocarbon oils.

Although the above polymeric pour point depressants may produce satisfactory results in specific applications, there is a continuing need for improved highly efficient oil pour point depressants having good pour point depressing properties in a wide range of hydrocarbonaceous oils.

SUMMARY OF THE INVENTION

It is an object of the invention to present new hydrocarbonaceous oil pour point depressants. It is another object of the invention to present hydrocarbonaceous oil compositions having improved pour points. It is another object of the invention to present a method of lowering the pour points of hydrocarbonaceous oils. These and other objects of the invention are supported in the following description and examples.

The objects of the invention are accomplished by incorporating into hydrocarbonaceous oils a terpolymer of a vinyl ester, the acid moiety of which has about 2 to 6 carbon atoms, vinyl alcohol and ethylene. The terpolymer desirably has a weight average molecular weight (determined by gel permeation chromatography) of about 1000 to 100,000 and is usually effective in concentrations of about 0.001 to 5 weight percent, based on the weight of hydrocarbonaceous oil. Suitable terpolymers are comprised of about 15 to 50 parts by weight of units of at least one vinyl ester, about 0.1 to 10 parts by weight of vinyl alcohol units and about 75 to 49 parts by weight of ethylene units per 100 parts by weight of total terpolymer. In preferred embodiments the terpolymer is comprised of about 20 to 45 parts by weight of units of vinyl esters having 2 to 4 carbon atoms in the acid moiety, about 1 to 5 parts by weight of a vinyl alcohol units and 50 to 75 parts by weight of ethylene units per 100 parts by weight of terpolymer; the weight average molecular weight of the terpolymer is in the range of about 3,000 to 50,000; and the terpolymer is added to the hydrocarbon oil at a concentration of about 0.005% to 1% and most preferably 0.01 to 0.5%, based on the weight of the hydrocarbon oil. In the most preferred embodiment the copolymer is comprised of about 25 to 40 parts by weight of vinyl ester units about 3 to 5 parts by weight of vinyl alcohol units and about 55 to 72 parts by weight of ethylene units per 100 parts of total terpolymer.

DETAILED DESCRIPTION OF THE INVENTION

The vinyl esters useful for the preparation of the pour point depressants are those prepared from acids having 2 to 6 and preferably 2 to 4 carbon atoms. In other words the vinyl esters will have 4 to 8 and preferably 4 to 6 total carbon atoms. The alkyl groups may be linear or branched. Typical useful vinyl esters include vinyl acetate, the vinyl propionates, the vinyl butyrates, etc. The preferred vinyl ester is vinyl acetate.

The vinyl esters used in the manufacture of products of this invention may be prepared by any of several well known commercial process. The preparation of the vinvl ester is not part of this invention.

The terpolymers of the invention are prepared by first copolymerizing the vinyl ester and ethylene components and subsequently hydrolyzing some of the vinyl ester groups to vinyl alcohol units. The polymerization of the ethylene and the vinyl esters can be accomplished by any of the known methods for polymerizing these two monomers. For example, the polymerization can be carried out in bulk, in solution, in emulsion or in the vapor phase using a wide variety of catalysts. Particularly useful catalysts are the free radical catalysts, such as the organic peroxides or azonitriles. Typical organic peroxides include acyl peroxides, such as benzoyl peroxide; alkyl peroxides, such as a t-butyl peroxide; ketone peroxides, such as methylethyl ketone peroxide; hydroperoxides, such as cumene hydroperoxide; and peresters, such as t-butyl perbenzoate. A typical azonitrile is azobisisobutyronitrile. The particular catalyst used will generally depend upon the selected polymerization reaction temperature. The amount of catalyst used in the polymerization reaction is generally in the range of about 0.01 to 10 weight percent, and usually is in the range of about 0.1 to 5 weight percent based on the total weight of monomers present in the reaction zone. The catalyst may be advantageously continuously charged to the reactor over the entire course of the reaction.

Where solution polymerization techniques are employed the solvent is one in which the monomers are soluble, such as butyl acetate, ethyl acetate or propyl acetate.

The polymerization is generally carried out, for a period of several hours, at a temperature of about 50° to 120° C. Temperatures in the range of about 80° to 110° C. are generally preferred.

A typical preparation of the vinyl ester, vinyl alcohol, ethylene terpolymer is as follows: A suitable reaction vessel equipped with an agitator and cooling means is purged with nitrogen to remove oxygen, sealed and charged with the desired solvent. The reactor contents are then heated to the desired reaction temperature. While maintaining the reaction temperature, vinyl ester, ethylene and a suitable polymerization catalyst are charged to the reaction vessel continuously during the course of the reaction, which begins upon addition of catalyst to the reactor. After all of the catalyst has been introduced, the reaction temperature may be maintained for an additional period of time, for example, about an hour. The temperature of the reactor contents is then lowered to effectively quench the reaction. At the conclusion of the quench step the reactor contents are cooled to about room temperature and the product is recovered from the reactor. The solvent is then removed from the polymeric product and heating is continued until evolution of acid released as a result of hydrolysis of the ester is completed, thereby forming vinyl alcohol moieties. The length of time the polymer is heated and the temperature to which the polymer is heated is dependent upon the amount of vinyl alcohol moieties desired in the polymer. The above method of preparation is merely illustrative and is not a part of this invention.

The additives of this invention can be used to lower the pour points of hydrocarbonaceous oils, which include crude oils, gas oils, hydrocarbon fuel oils such as distillate fuel oils, including kerosene, diesel oil, heating oils, etc. and residual fuel oils, such as bunker C oil and navy grade special fuel oils, and other oils which contain substantial quantities of waxy materials and which present low temperature pumping and handling problems. In treating such oils the vinyl ester/vinyl alcohol/ethylene terpolymer is introduced into the oil at a temperature above the solution temperature of the waxy component of the oil. This is usually above about 150° F. It has been found that the polymer is not as effective for producing the desired pour point depression if the mixing is carried out at a temperature substantially below the solution point of a substantial portion of the waxy component of the oil. As noted above, the polymer can be in the form of a solution in the solvent in which the polymerization took place. If the polymerization solvent has a low flash point and it is desired to use a solvent having a higher flash point for ease of handling the polymer can be separated from the solvent, as described above, and mixed with the desired solvent, such as an inert cutter stock, and the polymer-solvent mixture can be blended with the oil at an elevated temperature.

The following examples illustrate the preparation of the vinyl ester/vinyl alcohol/ethylene terpolymer and the use of the terpolymer as a pour point depressant. Unless otherwise specified, parts and percentages are on a weight basis. Pour points were determined by the procedure of ASTM D-97.

EXAMPLE I

To a 2-liter Paar autoclave was added 400 mls of ethyl acetate; the reactor was sealed, agitation was started and the reactor contents were heated to 100° C. Ethylene was then slowly charged into the autoclave until a pressure of 1000 psig was reached. The addition of a solution of 13.75 g of t-butyl peroctoate in 50 mls of ethyl acetate was started and maintained at a constant rate such that the total catalyst charge was added over a 3 hour period. The addition of 98±5 g of vinyl acetate was started at the same time the catalyst was started. The addition of vinyl acetate was maintained at a constant rate such that the total time of addition was 2 hours.

As the reaction proceeded, the pressure dropped as ethylene was consumed in the reaction. The system was periodically repressured to 1000 psig with ethylene to maintain the reactor pressure above about 950 psig.

When the rate of ethylene consumption dropped below 50 psig/hr., the reaction mixture was cooled and agitation was stopped. Unreacted ethylene was purged from the autoclave with nitrogen. The resultant polymer solution was pumped out of the reactor and the solvent was removed by flash evaporation. The polymer was then pumped through a heated stainless-steel loop maintained at a temperature between 150° and 250° C. to effect the thermal conversion of a portion of the vinyl ester to vinyl alcohol. The polymer was then dissolved in kerosene for ease of handling. The terpolymer was found to contain 60% ethylene, 37% vinyl acetate and 3% vinyl alcohol by weight.

The product of Example I was evaluated as a pour point depressant in various fuel oils. The results are tabulated in Table I. All additives were employed at a concentration of 250 ppm. Fuels A–F were number 2 fuel/diesel oils from various geographic regions in the United States.

TABLE I

| Test Liquid | Fuel A | Fuel B | Fuel C | Fuel D | Fuel E | Fuel F |
| --- | --- | --- | --- | --- | --- | --- |
| Additive | | | | | | |
| None | −5° F. | +10° F. | 0° F. | +10° F. | +5° F. | −10° F. |
| Commercial ethylene/vinyl acetate copolymer (60% ethylene/40% vinyl acetate) | −25 | −20 | −10 | 0 | <−50 | −20 |
| Commercial ethylene/vinyl acetate copolymer 65% ethylene/35% vinyl acetate) | −25 | −5 | −10 | −5 | −30 | −30 |
| Commercial ethylene/vinyl acetate copolymer (70% ethylene/30% vinyl acetate) | −15 | 0 | 0 | −5 | −25 | −20 |
| Ethylene/vinyl acetate/vinyl alcohol terpolymer product of Example I | −30 | −30 | −20 | −5 | <−50 | −30 |

The above examples show that terpolymers of ethylene/vinyl ester/vinyl alcohol are excellent pour point depressants for fuel oils. A comparison of results obtained using the Example I product and three commercial products as pour point depressants for fuel oils reveal that a ethylene/vinyl ester/vinyl alcohol terpolymer is equivalent to or superior to ethylene/vinyl acetate copolymers as a pour point depressant.

Although the invention has been described by specific working examples, the scope of the invention is not limited thereto. Modifications of the invention which are not illustrated are contemplated. For example, mixtures of vinyl esters having 1 to 4 carbon atoms may be substituted for the vinyl acetate compound. The scope of the invention is limited only by the scope of the appended claims.

What is claimed is:

1. An oil composition comprising a hydrocarbon oil and a pour point depressing amount of a terpolymer comprised of about 15 to 50 parts by weight of units of at least one vinyl ester, about 0.1 to 10 parts by weight of vinyl alcohol units and about 75 to 49 parts by weight of ethylene units per 100 parts by weight of terpolymer, said terpolymer having a weight average molecular weight of about 1,000 to 100,000.

2. The composition of claim 1 wherein said vinyl ester units contain 4 to 8 total carbon atoms and said terpolymer is present in said composition at a concentration of about 0.001 to 5.0 weight percent, based on the total weight of the composition.

3. The composition of either of claims 1 or 2 wherein said terpolymer comprises about 20 to 45 parts by weight of vinyl ester units, about 1 to 5 parts by weight of vinyl alcohol units and about 50 to 75 parts by weight of ethylene units per 100 parts by weight of terpolymer.

4. The composition of either of claims 1 or 2 wherein said vinyl ester contains 4 to 6 total carbon atoms.

5. The composition of claim 3 wherein the weight average molecular weight of the copolymer is 3,000 to 50,000.

6. The composition of claim 4 wherein the weight average molecular weight of the terpolymer is 3,000 to 50,000.

7. The composition of claim 5 wherein the terpolymer is present in said composition at a concentration of about 0.005 to 1%, based on the total weight of the oil composition.

8. The composition of claim 6 wherein the terpolymer is present in said composition at a concentration of about 0.005 to 1%, based on the total weight of the composition.

9. An oil composition comprised of a hydrocarbon fuel oil and a terpolymer of about 20 to 45 parts by weight of units of a least one vinyl ester containing 4 to 6 total carbon atoms, about 1 to 5 parts by weight of vinyl alcohol units and about 50 to 75 parts of ethylene units, said terpolymer having a weight average molecular weight of about 3,000 to 50,000 and being present in the composition at a concentration of about 0.005 to 1%, based on the total weight of the composition.

10. The composition of claim 9 wherein the vinyl ester is selected from the group consisting of vinyl acetate, vinyl propionate, vinyl butyrate and mixtures of these.

11. The composition of claim 10 where the vinyl ester is vinyl acetate.

12. In a method of depressing the pour point of a hydrocarbonaceous oil comprising incorporating into the hydrocarbonaceous oil a polymeric component, the improvement comprising using as the polymeric component a terpolymer comprised of about 15 to 50 parts by weight of units of at least one vinyl ester, about 0.1 to 10 parts by weight of vinyl alcohol units and about 75 to 49 parts by weight of ethylene units per 100 parts by weight of terpolymer, said terpolymer having a weight average molecular weight of about 1,000 to 100,000.

13. The improved process of claim 12 wherein said vinyl ester units contain 4 to 8 total carbon atoms and said terpolymer is present at a concentration of about 0.001 to 5.0 weight percent, based on the total weight of hydrocarbonaceous oil and polymeric component.

14. The improved process of either of claims 12 or 13 wherein said terpolymer comprises about 20 to 45 parts by weight of vinyl ester units, about 1 to 5 parts by weight of vinyl alcohol units and about 50 to 75 parts by weight of ethylene units per 100 parts by weight of terpolymer.

15. The improved process of either of claims 12 or 13 wherein said vinyl ester contains 4 to 6 total carbon atoms.

16. The improved process of claim 14 wherein the weight average molecular weight of the copolymer is 3,000 to 50,000.

17. The improved process of claim 15 wherein the weight average molecular weight of the terpolymer is 3,000 to 50,000.

18. The improved process of claim 16 wherein the terpolymer is present at a concentration of about 0.005 to 1%, based on the total weight of hydrocarbonaceous oil and polymeric component.

19. The improved process of claim 17 wherein the terpolymer is present at a concentration of about 0.005 to 1%, based on the total weight of the hydrocarbonaceous oil and polymeric component.

20. In a method of depressing the pour point of a hydrocarbonaceous oil comprising incorporating into the hydrocarbonaceous oil a polymeric component, the improvement comprising using as the polymeric component a terpolymer comprised of about 20 to 45 parts by weight of units of at least one vinyl ester containing 4 to 6 total carbon atoms, about 1 to 5 parts by weight of vinyl alcohol units and about 50 to 75 parts of ethylene units, said terpolymer having a weight average molecular weight of about 3,000 to 50,000 and being present at a concentration of about 0.005 to 1%, based on the total weight of hydrocarbonaceous oil and polymeric component.

21. The improved process of claim 20 wherein the vinyl ester is selected from the group consisting of vinyl acetate, vinyl propionate, vinyl butyrate and mixtures of these.

22. The improved process of claim 21 wherein the vinyl ester is vinyl acetate.

* * * * *